(No Model.) 8 Sheets—Sheet 1.

U., H. E. & F. L. EBERHARDT.
GEAR CUTTING MACHINE.

No. 510,121. Patented Dec. 5, 1893.

Attest:
L. Lee
Edw. P. Kinsey

Inventors.
U. Eberhardt and H. E. Eberhardt,
& F. L. Eberhardt,
per Crane & Miller, attys.

THE NATIONAL LITHOGRAPHING COMPANY,
WASHINGTON, D. C.

(No Model.) 8 Sheets—Sheet 3.

U, H. E. & F. L. EBERHARDT.
GEAR CUTTING MACHINE.

No. 510,121. Patented Dec. 5, 1893.

Fig. 3.

Attest:
L. Lee
Edw. F. Kinsey

Inventors.
Fred L. Eberhardt – U. Eberhardt and
H. E. Eberhardt, per
Crane & Miller, Attys.

(No Model.) 8 Sheets—Sheet 5.

U., H. E. & F. L. EBERHARDT.
GEAR CUTTING MACHINE.

No. 510,121. Patented Dec. 5, 1893.

Attest:
L. Lee
Edward King

Inventors.
U. Eberhardt and H. E. Eberhardt,
and F. L. Eberhardt— per Crane & Miller, Attys.

(No Model.) 8 Sheets—Sheet 6.

U., H. E. & F. L. EBERHARDT.
GEAR CUTTING MACHINE.

No. 510,121. Patented Dec. 5, 1893.

Attest:
L. Lee,
Edw. F. Kinsey,
and F. L. Eberhardt

Inventors.
U. Eberhardt and H. E. Eberhardt,
per Crane & Miller, Attys.

THE NATIONAL LITHOGRAPHING COMPANY,
WASHINGTON, D. C.

(No Model.) 8 Sheets—Sheet 7.

U, H. E. & F. L. EBERHARDT.
GEAR CUTTING MACHINE.

No. 510,121. Patented Dec. 5, 1893.

Attest:
L. Lee
Edw. T. Kinsey

Inventors.
U. Eberhardt, H. E. Eberhardt
and Fred L. Eberhardt, per
Crane & Miller, Attys.

(No Model.) 8 Sheets—Sheet 8.

U., H. E. & F. L. EBERHARDT.
GEAR CUTTING MACHINE.

No. 510,121. Patented Dec. 5, 1893.

UNITED STATES PATENT OFFICE.

ULRICH EBERHARDT, HENRY E. EBERHARDT, AND FRED L. EBERHARDT, OF NEWARK, NEW JERSEY.

GEAR-CUTTING MACHINE.

SPECIFICATION forming part of Letters Patent No. 510,121, dated December 5, 1893.

Application filed August 3, 1892. Serial No. 442,075. (No model.)

*To all whom it may concern:*

Be it known that we, ULRICH EBERHARDT, HENRY E. EBERHARDT, and FRED L. EBERHARDT, citizens of the United States, residing at Newark, Essex county, New Jersey, have invented certain new and useful Improvements in Gear-Cutting Machines, fully described and represented in the following specification and the accompanying drawings, forming a part of the same.

This invention consists in certain improvements adapted, first, to operate the entire gear cutting apparatus automatically through the medium of a single pulley and driving shaft mounted in fixed bearings so that the driving belt requires neither to be tightened nor shifted at any time; second, to feed the cutter head or carriage by means of a screw fixed rigidly thereto and actuated by a rotary nut; thirdly, to connect the feed screw with the driving shaft by two trains of gearing so that the rate of feed may be varied at pleasure, and the cutter be retracted at a uniformly quick rate; fourthly, to cool the cutters by means of a jet or bath of liquid, and to remove the liquid and chips together from the bath; fifthly, to facilitate the removal of the blank gear mandrel without moving it longitudinally, and also in other features of construction hereinafter described.

The invention will be understood by reference to the annexed drawings, in which—

Figs. 8, 9 and 10 show gearing for the feed screw, Fig. 8 being a plan, with a portion of the bed $A^2$; Fig. 9 a front view, and Fig. 10 a side view. Fig. 11 is an elevation of the inner side of the outboard bearing detached from its standard, and Fig. 12 an edge view of the same. Fig. 13 is a front view of the standard for outboard bearing. Figs. 4 to 16 are enlarged.

$A^2$ is the bed surrounded at the base with a trough $B^\times$. C are ways upon the top of the bed to which the cutter head or carriage D is fitted.

E is the column mounted upon one end of the bed and provided with a mandrel bearing F carrying a hollow spindle G having a worm wheel H upon its outer end. The bearing F is made movable for vertical adjustment and provided with screw $C^5$ to move the same, (see Fig. 1.) A bracket G' is attached to the outer end of the bearing G, and provided with boxes $G^2$ to support a worm shaft I. The worm I' meshes with the worm wheel H and is driven, through shaft H' and gears $H^2$, by a friction gear $I^2$ which may be made of any suitable construction such as is described in United States Patent No. 308,658, issued December 2, 1884.

Figure 1:
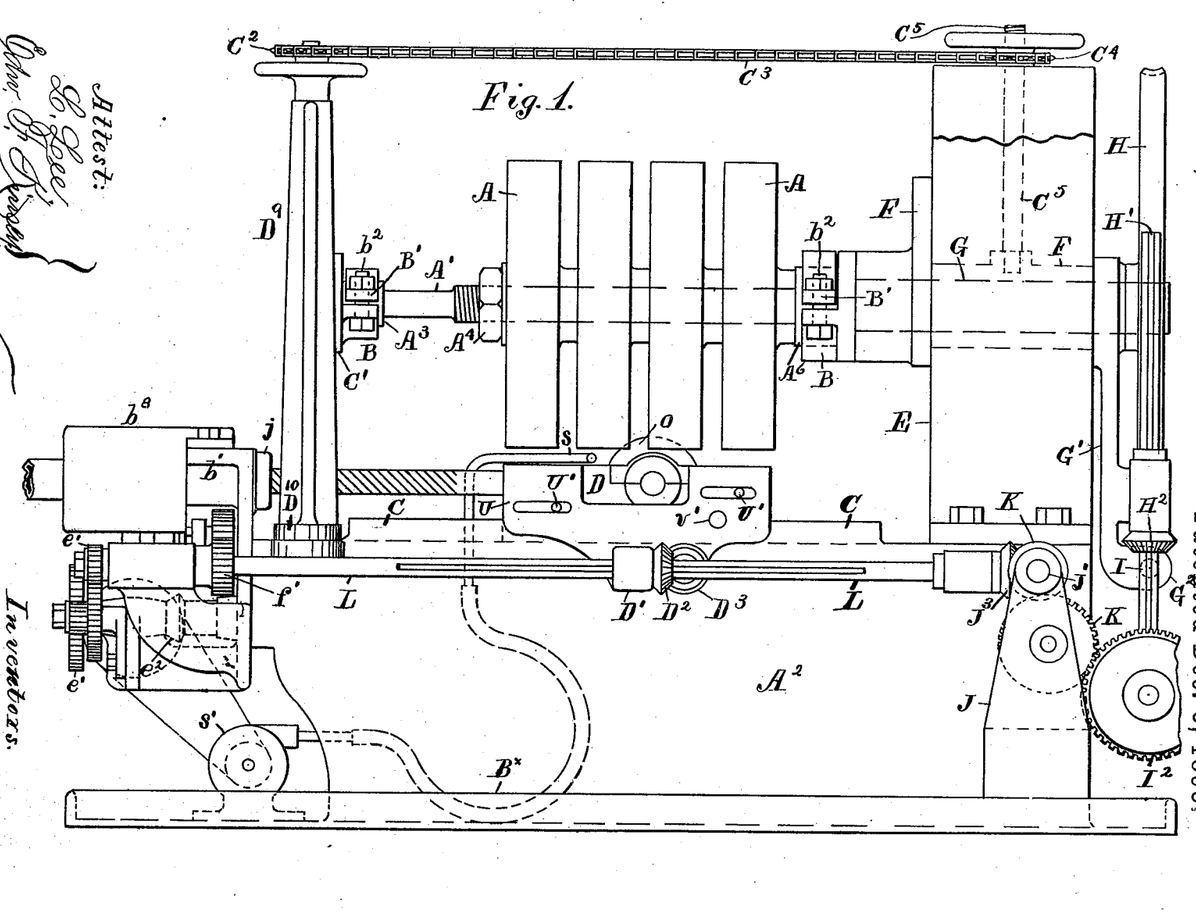
Figure 1 is a side elevation of the gear cutter.
Figure 3:
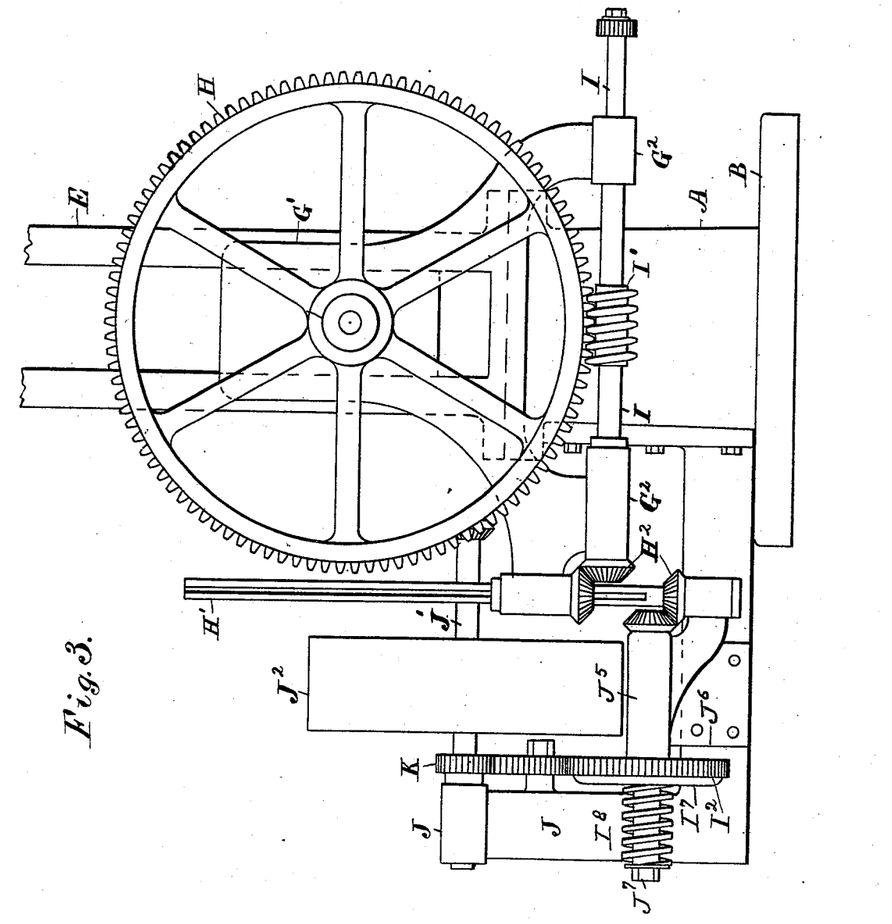
Fig. 3 is a rear elevation upon a larger scale with the top of the column omitted.
Figure 6:
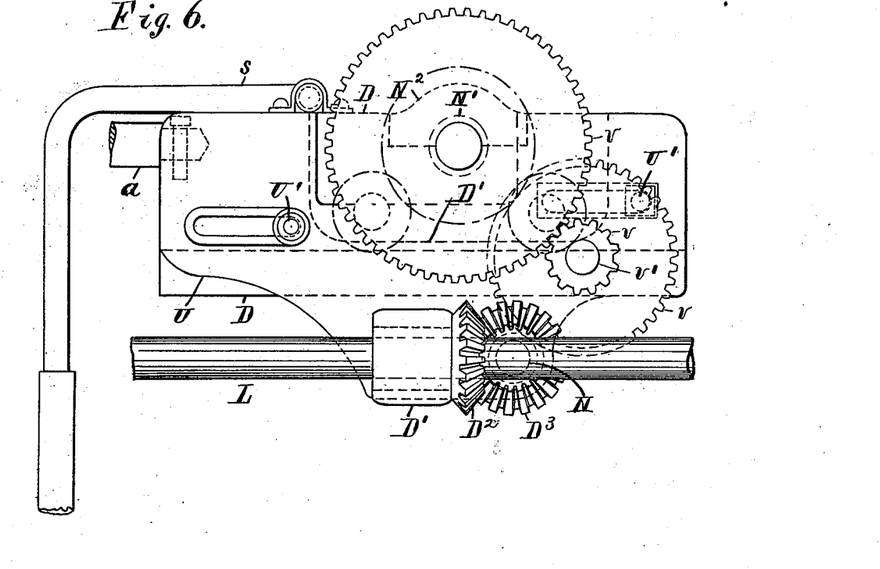
Fig. 6 is an end view, and Fig. 7 a side view of the carriage.

A bracket J is projected from the side of the bed at the base of the column E and carries a driving shaft J' with a pulley $J^2$ fixed thereon. A bearing $J^5$ is projected from the bottom of the bracket and is shown in Fig. 3 with foot $J^6$ bolted thereto. In this bearing a shaft $J^7$ is mounted with the toothed gear $I^3$ upon its outer end, combined with a friction plate $I^7$, spring $I^8$, and a cog wheel which is connected with the shaft J' by gears K. The shaft $J^7$ is provided with one of the gears $H^2$ to drive the worm I', which, through the medium of the friction driver, may be rotated or arrested by a suitable lock as is common in automatic gear cutters. The shaft J' is connected by bevel gears $J^3$ to a shaft L which is extended along the side of the bed $A^2$, to the outer end of the same for actuating the cutter and feed screw. The cutter head D is provided with a bearing D' surrounding the shaft L, and a bevel gear $D^2$ is fitted by a sleeve and spline to the bearing D' and the shaft. The bearing D' is attached to the end of the cutter head D by a bracket U which is adjustable upon bolts U' and carries a stud N to which is fitted a bevel wheel $D^3$ to mesh with the wheel $D^2$. The cutter arbor N' is connected with the wheel $D^3$ by change wheels V, by which the speed of the cutter may be varied at pleasure. The adjustability of the bracket U upon the cutter head permits the setting of the change wheels when applied to the wheel $D^3$, the arbor N', and an intermediate stud V' upon the bracket. The arbor is mounted in two bearings $N^2$, and a space O' adapted to receive the cutter is formed between the two bearings, and the cutter O is secured upon the arbor and revolved within the space. The space, when closed at the bottom (as indicated by the line D' in Fig. 6), forms a bath into which the liquid falls from the cutter, and in which the cutter revolves until the liquid is withdrawn. The end of the arbor is projected through the outer bearing and provided with a cog-wheel $O^8$, to drive a couple of conveyers or worm carriers P which are inserted in the bottom of the bath and provided at their outer ends with gears P'. The bearings $N^2$ are provided with removable caps, as shown in Fig. 1, to apply the cutter to the arbor in the aperture O'.

Figures 4, 5:
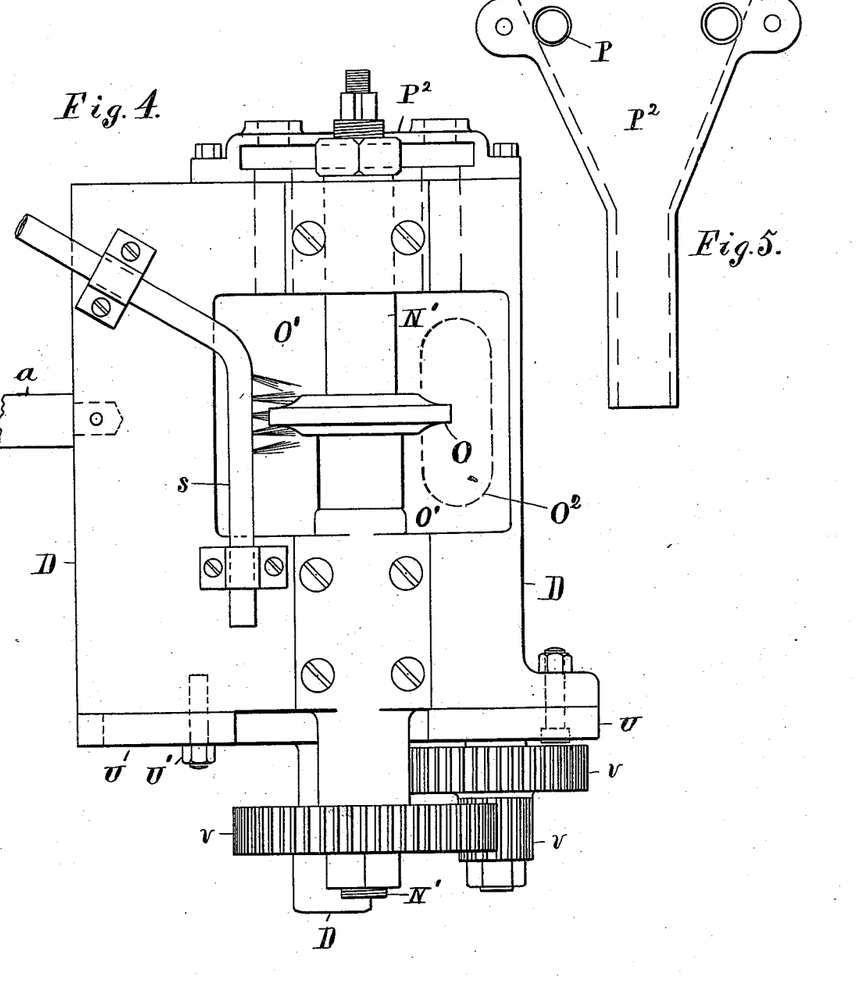
Fig. 4 is a plan of the cutter head or carriage.
Fig. 5 is a side view of the hopper receiving the chips and fluid from the tank in cutter head.

A spout or hopper $P^2$ is attached to the outside of the carriage around the outer end of each conveyer P, and the conveyer operates to draw the chips from the bottom of the bath and to discharge them into the hopper, as well as the liquid in which they are immersed. The mixture of chips and liquid is discharged into the trough B from which the chips are removed from time to time, while the liquid may be used over and over to cool the cutter. A jet pipe $s$ is applied at one side of the bath and perforated to discharge a cooling liquid upon the cutter O (shown in Figs. 1, 2 and 4) and such pipe is extended to a rotary pump $s'$ set within the trough B to draw the liquid continuously therefrom and to project it upon the cutter in the desired degree.

The pump $s'$ is rotated at a suitable speed to supply the liquid at the same rate at which it is discharged by the conveyers.

A series of blanks A are shown mounted upon a mandrel A' which is connected detachably with the spindle G by means of a split chuck or bearing B. An outboard bearing C' for the mandrel is provided in a standard $D^9$; the standard having its foot $D^{10}$ secured upon the outer end of the bed, and the bearing C' being provided with an adjusting screw $c^2$ and hand-wheel $C^2$ to turn the same. The bearing C' is provided also with a split chuck B. Each chuck consists in a hub divided centrally and provided with lugs B' for clamping the parts together as by the bolts $b^2$. The spindle G is provided upon its outer end with one half of the chuck, and the other half is removable, and the bearing C' is constructed in a similar manner, and the mandrel A' is constructed of suitable length to fit between the end of the spindle and the inner face of the bearing C', so that when the movable parts of the chuck are detached the spindle may be lifted laterally from both chucks without any longitudinal movement. A chain wheel $C^2$ upon a screw $c^2$ in the standard $D^9$ is connected by a chain $C^3$ with a chain wheel $C^4$ secured upon a screw $C^5$ to raise and lower the bearing F, by which means the two chucks B may be adjusted simultaneously. The two screws may be connected by other equivalent mechanism.

Figure 2:
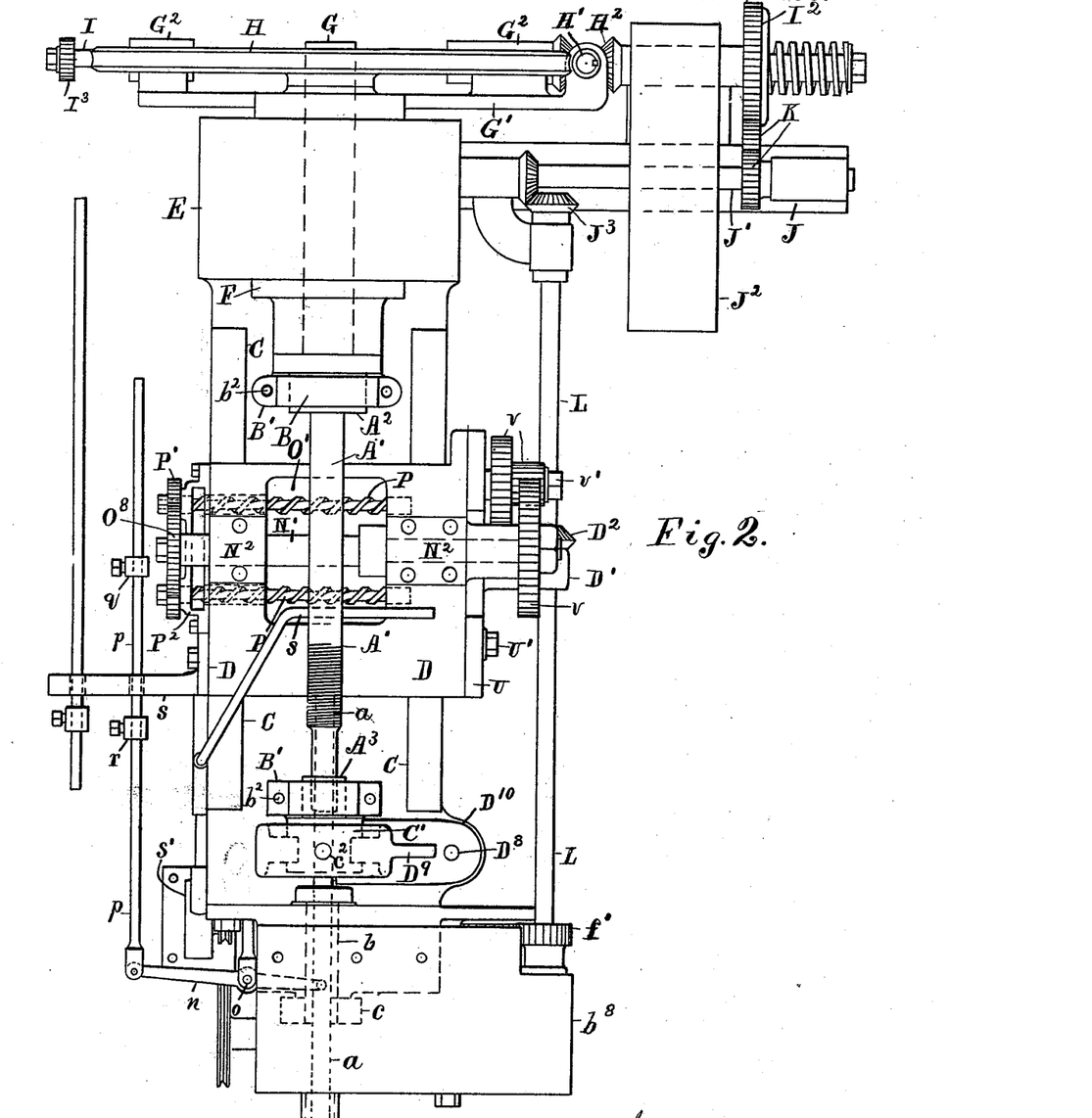
Fig. 2 is a plan.
Figure 14:
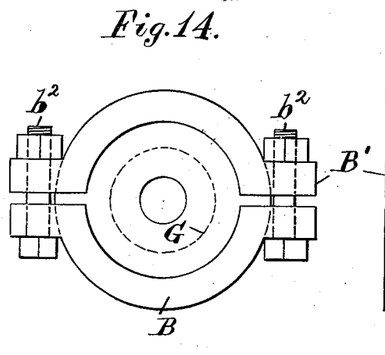
Fig. 14 is an end view of the spindle G with the mandrel chuck or bearing.
Figure 15:
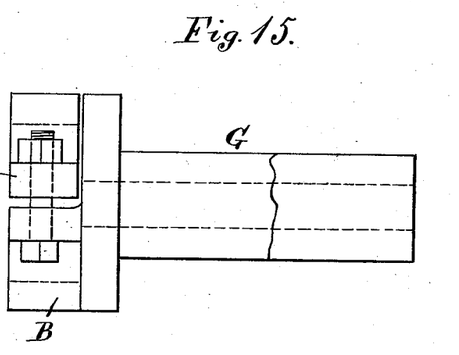
Fig. 15 is an edge view of the same.

The spindle G is shown hollow in Fig. 14, and the bolt $A^5$ is shown tapped in the rear end of the mandrel to be passed through the spindle. Such bolt may be used to hold the mandrel to the spindle firmly, but does not prevent its lateral removal as a solid shank fitted within the hollow spindle would do. By removing the bolt, the mandrel may be taken out laterally. Mandrels with solid shanks may however be used in the same spindle, and to facilitate their use the standard foot $D^{10}$ is shown in Fig. 2 swiveled to the bed by bolt $D^8$, to swing the outboard bearing out of the way when used with such a mandrel. With such a mandrel, the blanks interfere with the cutter, and the bearing F and spindle G require to be raised when inserting the mandrel. Such shifting of the spindle G necessitates a careful resetting of the same before cutting the next series of blanks, which requires both care and time, and is wholly obviated with the use of split chucks to hold the mandrel.

Figure 16:
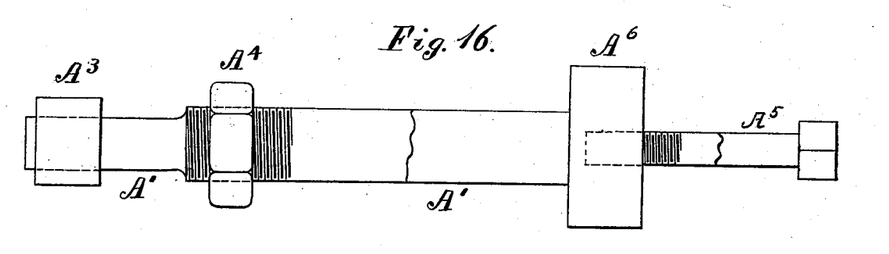
Fig. 16 is a side view of the mandrel with the fastening bolt at the inner end, and a bush at the outer end to fit the outboard bearing.

Whatever the size of the mandrel it is preferably formed as shown in Figs. 1 and 16 with an integral collar $A^6$ fitted snugly to the interior of the chuck upon the spindle, by which means the same hole in the chuck is adapted to fit any size of mandrel, and the opposite end of the mandrel is provided with a detachable bushing $A^3$, the exterior of which is made to fit the interior of the chuck upon the outboard bearing C. A nut $A^4$ is fitted to a thread upon the mandrel to clamp the blank or blanks against the collar $A^6$ as usual. The improvement in the mandrel thus consists in adapting its length to the space between the bearings F and C', when the latter are properly adjusted to hold the mandrel in its working position, and the improvement in the bearings themselves consists in forming each with a chuck or mandrel support open at one side, from which the mandrel can be removed laterally, and provided with means for clamping the mandrel when in operation. The chucks are shown with two similar halves clamped together by the bolts $b^2$, but the construction of the chucks may be varied, as the novelty consists mainly in the combination of the open sided bearings with a mandrel made to fit the space between the two bearings so that it may be removed laterally without changing the adjustment of either bearing; and the mandrel may thus be repeatedly filled with blanks and all of the blanks cut of exactly the same dimensions.

Figure 8:
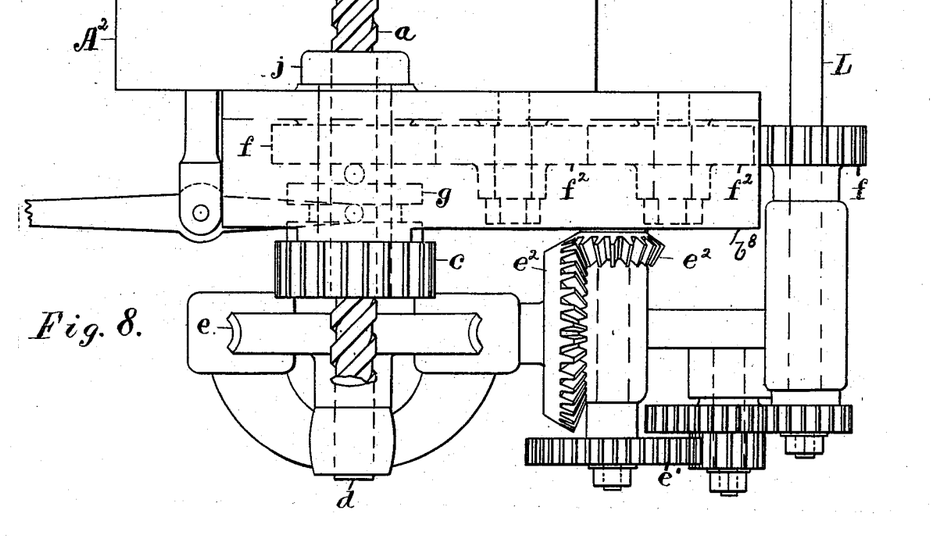
Figure 9:
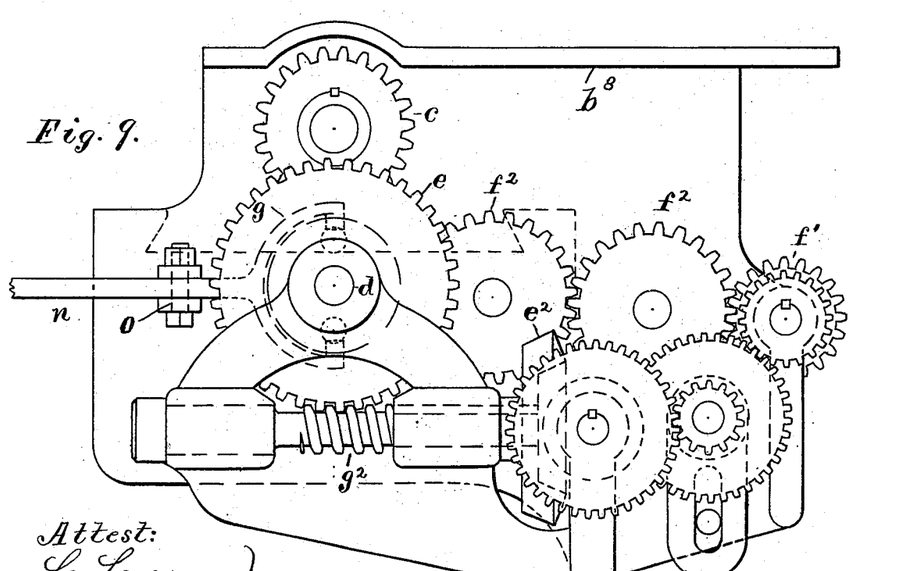
Figures 10, 11, 12, 13:
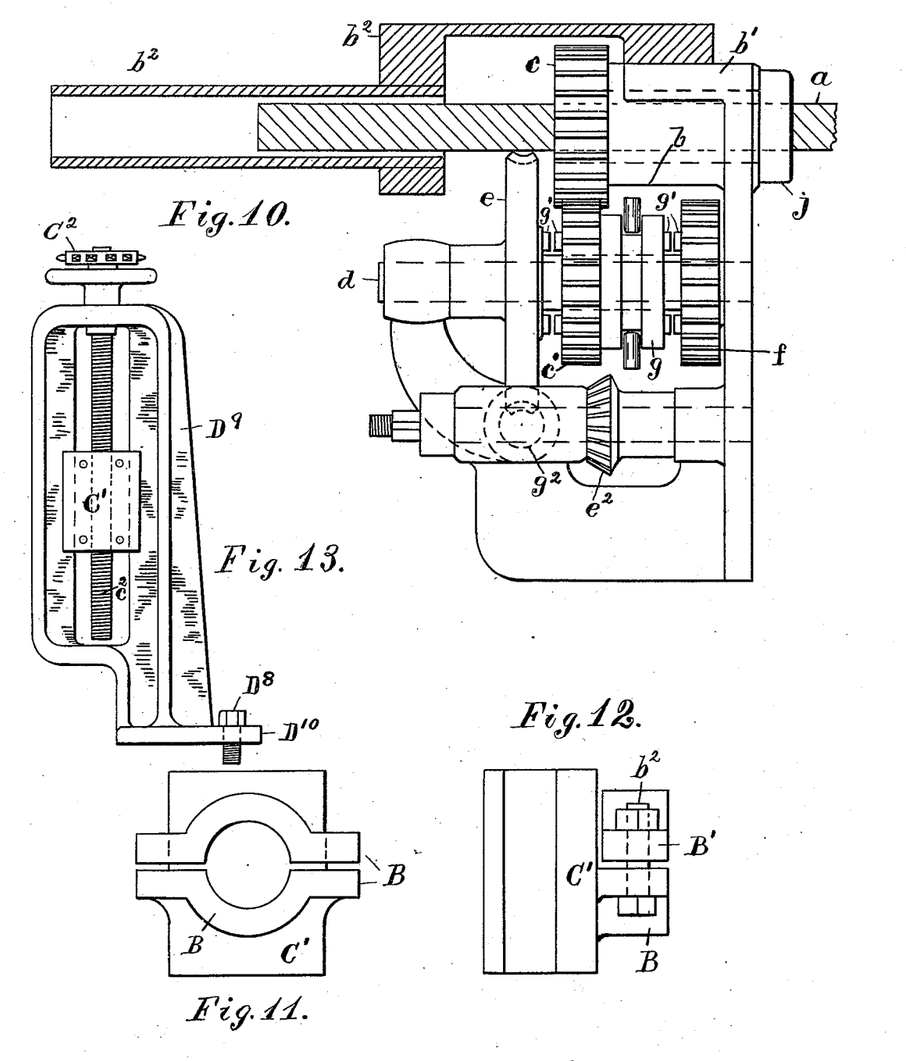

The improvement in the feed gearing consists in providing two separate trains of wheels, one of which operates to feed the cutter head or carriage D forward at a slow rate, and the other to retract it more rapidly when the cut is finished. Means are provided for using change wheels for feeding at various rates according to the nature of the work, while the reverse gearing is proportioned to constantly retract the cutter head at the highest possible speed. To produce such high speed, the screw is preferably formed with a coarse or triple thread, and to avoid the clutching of the two trains of gearing separately to the screw, a rotary nut is employed and the screw is attached rigidly to the cutter head D. The screw $a$ is inserted in a socket in the cutter head on a level with the center of the cutter spindle N, and the thrust of the screw thus operates to push the cutter head or carriage forward without tilting the same as the resistance of the cutter is transmitted to the cutter head entirely through its spindle. The advantage of such arrangement may obviously be secured by connecting the screw with the cutter head substantially on a level with the center of the spindle N, and it is therefore immaterial whether the screw be set a little above or below such level. The feed nut $b$ is held in a bearing $b'$ by a feed gear $c$ formed upon one end and a collar $j$ at the other. A feed shaft $d$ is mounted adjacent to the screw and provided with a worm wheel $e$ and a cog wheel $f$ between which a clutch hub $g$ is fitted to move longitudinally, and adapted by means of teeth $g'$ to engage with either of the wheels $e$ or $f$. The clutch hub $g$ is provided with a gear $c'$ to transmit to the nut $b$ the motion of the wheel $e$ or $f$. The wheel $f$ is connected with the shaft L by means of a gear $f'$ and suitable intermediates $f^2$, and thus turns at a uniform speed. The worm wheel $e$ is actuated by a worm $g^2$ and change wheels $e'$ (see Fig. 8), one of which is affixed to the shaft L and the other to a shaft $h$ which actuates the worm through bevel wheels $e^3$. Such bevel wheels are used to rotate the worm at right angles to the shaft L; but other arrangements of gearing may be used provided the shaft L is connected with the feed screw by change wheels so as to vary the speed of the screw as required. This part of the invention consists in connecting the shaft L with the feed screw by separate trains of gearing, so as to retract the cutter head at a uniform high rate of speed, regardless of any required variations in the feed.

The clutch hub $g$ is shifted when the cutter head reaches each end of the stroke by an arm $n$ upon a pivot $o$, which arm is shifted by a rod $p$ having dogs $q$ and $r$ actuated by a lug $s$ upon the cutter head D. The rod may be connected with the rock shaft by an arm which is shifted quickly when it is pushed to the middle of its stroke in either direction by a spring roller as is common in such constructions. A guard $b^8$ is shown over the feed gearing in Figs. 1, 2, 9 and 10.

The means for shifting the clutch forms no part of the present invention. The means for regulating the rotations of the worm I' and thus terminating the arc through which the blanks A are moved after each reciprocation of the cutter head, is not shown herein as it is already well known, and forms no part of the present invention. A gear $I^3$ is shown upon the end of the worm shaft I opposite the friction gear $I^2$, and may be connected with stop mechanism similar to that described in United States Patent No. 308,659, issued December 2, 1884, by which the friction gear may operate to rotate the worm wheel H through a given arc after each retraction of the cutter.

The above improvements greatly facilitate the application of the blanks to the machine and the removal of the cut gears therefrom. They avoid a readjustment of the spindle which rotates the blanks each time that the mandrel with fresh blanks is inserted in the machine, and by the cooling of the cutter they permit the feeding of the cutter through the blank at a very high rate, and the rapid completion of the work. The actuation of the entire machine automatically by a single driving pulley obviates the need of any counter shaft whatsoever in the operation of the machine, and avoids the complication of a tightener upon a belt, and derangement which is liable to occur with the use of a belt tightener. The construction and working of the machine is also simplified by the use of a single shaft L to actuate the cutter and the feed, with separate change wheels for each to vary the speed of the feed and the cutter independently. The connection of the feed screw with the driving shaft through a separate train of gears for retracting the cutter head or carriage also secures the highest rapidity for such movement at all times, whatever speed may be imparted to the screw during the feeding movement.

The swiveling of the standard which carries the outboard bearing, adapts the standard to be used with the old class of mandrel which is inserted in the hollow spindle and is retracted longitudinally therefrom; while the chuck B upon the outboard bearing adapts it for use with the spindle described herein, which may be lifted from the bearings by a lateral movement, to avoid interference with the cutter or the readjustment of the bearings.

By gearing the mandrel bearing G to the outboard bearing C', the mandrel may be raised and lowered as required, to vary the depth of the cut, without adjusting the bearings C' and G independently, and the work is not only facilitated but greater accuracy is secured.

Figure 7:
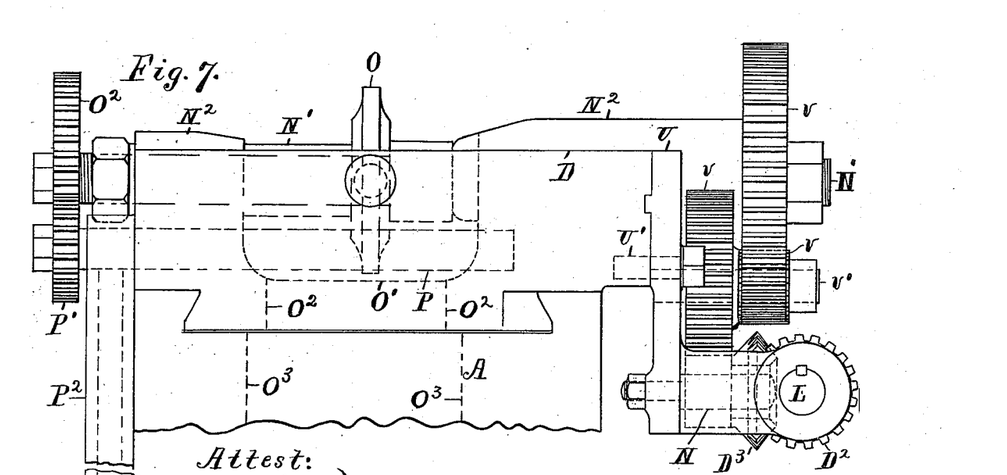

The chips and cooling fluid may obviously be discharged from the space O' by other means than that which is shown in the drawings; as the operation of the cutter depends upon the removal of the chips and fluid as they accummulate. Where an opening is admissible through the top of the bed $A^2$, the chips and fluid may be discharged directly from the bottom of the space O' through an aperture formed in the bottom of the cutter head D. Such a construction is indicated in the dotted lines O² in Figs. 4 and 7, and in the latter figure dotted lines O³ are shown to indicate a passage through the top of the bed A². Where such openings are admissible, the chips and fluid may be received by any suitable receptacle in the under part of the bed. Such opening is not claimed herein as it is claimed by us in a separate application, and claim is made herein to a bath with closed bottom, and worms to remove the chips and liquid therefrom.

What is claimed herein is—

1. A gear cutter having a bed with cutter head movable upon the top of the same, a column upon the bed with mandrel head adjustable vertically thereon, a cutter spindle mounted upon the cutter head, with a feed screw to actuate the same, bearings fixed upon the bed or base of the machine, a driving shaft mounted in such fixed bearings, with a driving pulley thereon, and the train of gearing connecting such fixed pulley shaft with the movable cutter spindle, as set forth.

2. A gear cutter having a bed with cutter head movable upon the top of the same, a column upon the bed with mandrel head adjustable vertically thereon, a cutter spindle mounted upon the cutter head, with a feed screw to actuate the same, bearings fixed upon the bed or base of the machine, a driving shaft mounted in such fixed bearings, with a driving pulley thereon, the train of gearing connecting such fixed pulley shaft with the movable cutter spindle, and a separate train of gearing connecting the fixed pulley shaft with the feed screw, substantially as set forth.

3. A gear cutter having a bed with cutter head movable upon the top of the same, a column upon the bed with mandrel head adjustable vertically thereon, with a worm wheel and worm carried by such mandrel head to rotate the blank, a cutter spindle mounted upon the cutter head, with a feed screw to actuate the same, bearings fixed upon the bed or base of the machine, a driving shaft mounted in such fixed bearings, with a driving pulley thereon, the train of gearing connecting such fixed pulley shaft with the cutter spindle upon the movable cutter head, the separate train of gearing connecting the fixed pulley shaft with the feed screw, and the separate train of gearing connecting the fixed pulley shaft with the worm upon the adjustable mandrel head, as set forth.

4. The combination, with a suitable bed and a single driving pulley having a shaft mounted in fixed bearings upon the bed, of a train of gearing actuated by such pulley for rotating the blank, a separate train of gearing with change wheels for rotating the cutter at a changeable rate of speed, and a separate train of gearing with change wheels for feeding the cutter head at a changeable rate of speed, the combination being adapted to actuate all the parts by means of a single driving belt, substantially as herein set forth.

5. The combination, with a suitable bed and a single driving pulley having a shaft mounted in fixed bearings upon the bed, of a train of gearing actuated by such pulley for rotating the blank, a separate train of gearing with change wheels for rotating the cutter at a changeable rate of speed, a separate train of gearing with change wheels for feeding the cutter head forward at a changeable rate of speed, and a separate train of gearing for retracting the cutter head at a uniform rate of speed, the combination being adapted to actuate all of the parts by means of a single driving belt, substantially as herein set forth.

6. In a gear cutter, the combination, with a cutter head having two spindle bearings and a space between the same, of a cutter spindle with a cutter rotated in such space, a jet pipe for projecting a cooling fluid upon the cutter, a pan formed around the bottom of the bed, and an outlet to discharge the chips and fluid from the space to such pan, substantially as herein set forth.

7. In a gear cutter, the combination, with a cutter head having spindle bearings and a bath adjacent thereto, of a cutter spindle with a cutter rotated in the bath, a jet pipe for projecting a cooling fluid upon the cutter, one or more worms to discharge the chips and fluid from the bath, and a spout delivering the chips and fluid from the worms to a receptacle outside of the bath, as set forth.

8. A gear cutter having a bed with cutter head movable upon the top of the same, a column with mandrel head adjustable vertically thereon, a spindle with worm and worm wheel carried by such head for rotating the blank, a mandrel bearing upon such spindle with opening at one side to insert the mandrel, an outboard bearing fixed in line with the spindle and open upon one side to insert the mandrel, and means, as the caps B', for clamping the opposite ends of a mandrel in such bearings, the whole being adapted to insert and remove the mandrel laterally, substantially as herein set forth.

9. A gear cutter having a bed with cutter head movable upon the top of the same, a column with mandrel head adjustable vertically thereon, a spindle with worm and worm wheel carried by such head for rotating the blank, a mandrel bearing upon such spindle with opening at one side to insert the mandrel, an outboard bearing fixed in line with the spindle and open upon one side to insert the mandrel, a mandrel with collar $A^6$ at one end to fit the spindle bearing, and caps B' applied to the bearings, the whole being adapted to insert and remove the mandrel laterally, substantially as herein set forth.

10. A gear cutter having a bed with cutter head movable upon the top of the same, a column with mandrel head adjustable vertically thereon, a spindle with worm and worm wheel carried by such head for rotating the blank, a mandrel bearing upon such spindle with opening at one side to insert the mandrel, an outboard bearing fixed in line with the spindle and open upon one side to insert the mandrel, a bushing $A^3$ applied to the outboard bearing, a mandrel with collar $A^6$ at one end to fit the spindle bearing, and caps $B'$ fitted to the bearings, the whole being adapted to apply a series of different mandrels to the same bearings, substantially as set forth.

11. In a gear cutter, the combination, with a bed having a cutter head movable thereon, of a spindle for rotating the blank, a standard having an outboard bearing fixed in line with the spindle, chucks open at one side and fixed upon the spindle and the outboard bearing, and means, as the swiveling foot $D^{10}$ for turning the standard upon the bed A, as herein set forth.

12. In a gear cutter, the combination, with a bed having a cutter head movable thereon, of the column E having the adjustable bearing F supporting the spindle G for rotating the blank, a standard having an outboard bearing adjustable vertically, and means, as the chain wheel $C^2$, the chain $C^3$, and the chain wheel $C^4$ for adjusting the bearings simultaneously to and from the bed, as herein set forth.

13. The combination in a gear cutter, of the bed A with cutter head D movable upon the top of the same, the column E with mandrel head F adjustable vertically thereon, the spindle G with worm wheel H and worm $I'$ for rotating the same, the bracket J fixed upon the bed A, the pulley shaft $J'$ with pulley $J^2$, the train of gearing connecting the pulley shaft with the worm $I'$, and the separate train of gearing connecting the pulley shaft with the cutter spindle $N'$, as herein set forth.

14. The combination in a gear cutter, of the bed A with cutter head D movable upon the top of the same, the column E with mandrel head F adjustable vertically thereon, the spindle G with worm wheel H and worm $I'$ for rotating the same, the bracket J fixed upon the bed A, the pulley shaft $J'$ with pulley $J^2$, the splined shaft L connected with the shaft $J'$ by bevel gears, and the gear $D^3$ connected by the change wheels $v$ with the cutter spindle, and with the splined shaft L by the feathered gear $D^2$, substantially as herein set forth.

15. The combination in a gear cutter, of the bed A with the cutter head D movable upon the top of the same, the column E with mandrel head F adjustable vertically thereon, the spindle G with worm wheel H and worm $I'$ for rotating the same, the bracket J fixed upon the bed A, the pulley shaft $J'$ with pulley $J^2$, the splined shaft L connected with the shaft $J'$ by bevel gears $J^3$ and with the cutter spindle by suitable gearing, and the splined shaft $H'$ connected with the worm shaft I by suitable gearing, and with the shaft $J'$ by a friction driver, substantially as set forth.

16. The combination in a gear cutter, of the bed A with cutter head D movable upon the top of the same, the column E with mandrel head F adjustable vertically thereon, the spindle G with worm wheel H and worm $I'$ for rotating the same, the bracket J fixed upon the bed A, the pulley shaft $J'$ with pulley $J^2$, the bearing $J^5$ with shaft $J^7$ and friction driver $I^2$ connected with the shaft $J'$ by gears K, and the splined shaft $H'$ connected with the worm shaft I and the shaft $J^7$ by bevel wheels $H^2$, substantially as herein set forth.

In testimony whereof we have hereunto set our hands in the presence of two subscribing witnesses.

ULRICH EBERHARDT.
HENRY E. EBERHARDT.
FRED L. EBERHARDT.

Witnesses as to Ulrich and F. L. Eberhardt:
JOSEPH B. PIERSON,
THOMAS S. CRANE.

Witnesses as to H. E. Eberhardt:
HENRY W. ECKEL,
CHARLES H. PECK.